UNITED STATES PATENT OFFICE.

JOSEPH M. LIPPINCOTT, OF KILBUCK TOWNSHIP, ALLEGHENY COUNTY, PENNSYLVANIA, AND JOHN LIPPINCOTT, OF BALTIMORE, MARYLAND.

FERTILIZER.

SPECIFICATION forming part of Letters Patent No. 238,240, dated March 1, 1881.

Application filed July 17, 1880. (Specimens.)

*To all whom it may concern:*

Be it known that we, JOSEPH M. LIPPINCOTT, of Kilbuck township, in the county of Allegheny and State of Pennsylvania, and JOHN LIPPINCOTT, of Baltimore, in the county of Baltimore and State of Maryland, have invented a new and useful Improvement in Fertilizers; and we do hereby declare the following to be a full, clear, and exact description thereof.

Our invention relates to the fertilizers used in the different soils for the purpose of increasing their productiveness.

Heretofore many different kinds of fertilizers have been employed for this purpose, such as ground bone, phosphates, superphosphates, ammoniates, nitrates, sodas, and compositions of these and other substances. Manures and fertilizers have also been formed from the slag produced in manufacturing or converting pig-iron into cast or wrought iron, Bessemer, or open-hearth steel. The slag thus produced in treating the pig-iron generally contains a large amount of iron and phosphorus, both of which are of considerable commercial value, and are utilized in different ways to obtain the iron or phosphorus contained therein. The Bessemer and open-hearth slags are generally so treated as to remove the phosphorus which is employed with other materials in fertilizing.

The object of our invention is to produce a base or part mixture of fertilizers possessing many of the advantageous qualities of the more expensive materials and compounds above referred to at a comparatively low cost, and this we are enabled to do by utilizing a material which has heretofore been considered a waste product, and been thrown aside as worthless.

It consists in a base or part mixture of fertilizers formed from the slag or scoria produced in blast-furnaces for the manufacture of pig-iron from iron ores, reduced to the necessary degree of fineness for use by grinding, pulverizing, or other suitable means.

To enable others skilled in the art to make and use our invention, we will describe it more fully.

In the manufacture of pig-iron from the iron ores in smelting or blast furnaces, the limestone used as a flux to melt the ores, in connection with the coal, coke, charcoal, or other fuel employed, is calcined by the heat, the major portion of its carbonic acid being driven off thereby, and at the same time it absorbs or takes up from the fuel and ores more or less of the elements contained therein, such as silica, alumina, iron, sulphur, magnesia, &c., either combined or as oxides or acids, and thus forms the slag or scoria. The proportions of these ingredients in the slag vary, according to the ores and fuel used, the lime and the silica being the principal ingredients.

The slag or scoria usually produced is generally of two kinds, the vitreous or glassy slag and the non-vitreous or gray slag, the slags being practically the same, excepting that in one there has been a combination of the silica and lime, forming a glass which is mingled with the other elements contained in the slag. The non-vitreous is the kind preferred for the manufacture of a fertilizer, as all the elements, when pulverized, are soluble in the soil, and are readily taken up by the growing crops.

The following analysis made of the slag shows about the proportions of the elements contained therein, though they vary according to the ores, fuels, and limestone used: Silica, 38.31 parts; lime, 44.73; alumina, 9.77; magnesia, 1.63; protoxide of iron, 1.50; sulphide of calcium, 2.91; phosphoric acid, a trace, and alkalies and water a trace. This slag has heretofore been considered as comparatively worthless, its principal use being as ballast on railroads.

The slag is reduced by any convient means, such as by crushing or pulverizing to the necessary degree of fineness, it being generally ground to a sand or powder, or fine enough to drill with the wheat or grain, as is usually practiced with other fertilizers. The pulverized slag of itself forms an excellent fertilizer, being applied in the same manner and in about the same quantities to the various crops as is now practiced with other fertilizers, and practical tests have demonstrated that it not only hastens but increases the growth and yield of the grain.

While the pulverized slag has proven an excellent fertilizer, and has considerably increased the yield from the ground with which it is used, still better results have been obtained by treating the slag in its pulverized state with acid, for the purpose of dissolving it, as now practiced with South Carolina phosphate-rock, bone, &c., the acid treatment making it more soluble, and enabling the growing crops to take it up much faster, to their improvement, than when undissolved. Different acids may be used for this purpose, such as sulphuric, muriatic, or phosphoric acid. We find, in practice, that the ordinary commercial sulphuric acid, diluted with ten parts of water, applied and mixed with the powdered slag in sufficient quantities to dampen it, will dissolve it, during which process a considerable amount of heat, caused by the action of the acid upon the elements contained in the slag, will be present. The completion of the process will be indicated when the mass becomes cool, and it is then dried and ready for use. The principal use, however, of the pulverized slag is as a base for other more expensive fertilizers, or, in combination with other fertilizers, to the improvement and cheapening of the same. It may also be used as a drier for some of the fertilizers which have been treated with acids to dissolve them, such as bone, phosphate-rock, &c., to absorb the surplus acids therein, the acids in the fertilizers serving to dissolve the slag when mixed therewith. It may be used in this manner as a base, drier, or mixture with all artificial fertilizers, such as ground bone, phosphates, superphosphates, coprolites, phosphate-rock, ammoniates, nitrates, sodas, salt, and compositions of these and other substances commonly employed in manufacturing artificial manures.

What we claim as our invention, and desire to secure by Letters Patent, is—

A base or part mixture, in the manufacture of fertilizers, formed of the slag or scoria produced in blast-furnaces for the manufacture of pig-iron from iron ores, said slag having about the composition herein set forth, substantially as and for the purposes described.

In testimony whereof we, the said JOSEPH M. LIPPINCOTT and JOHN LIPPINCOTT, have hereunto set our hands.

JOS. M. LIPPINCOTT.
JOHN LIPPINCOTT.

Witnesses:
OSSIAN R. TERBURGH,
JAMES I. KAY.